Jan. 12, 1937.  C. A. HEILAND  2,067,636
VIBRATION DETECTOR
Filed April 24, 1934  2 Sheets—Sheet 1
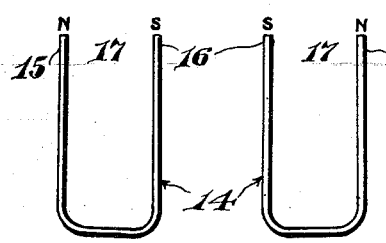
Fig.1.
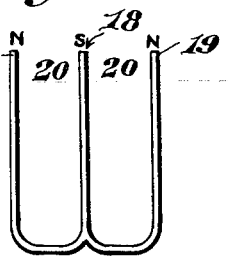
Fig.2.
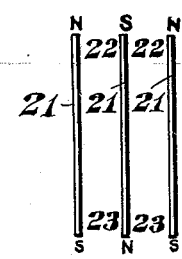
Fig.3.
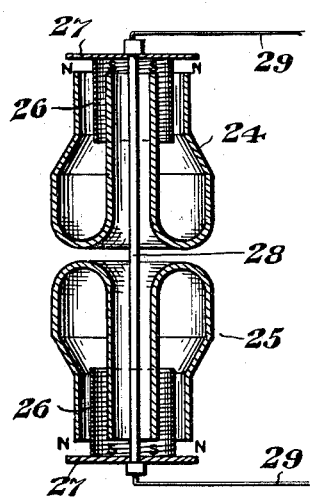
Fig.4.
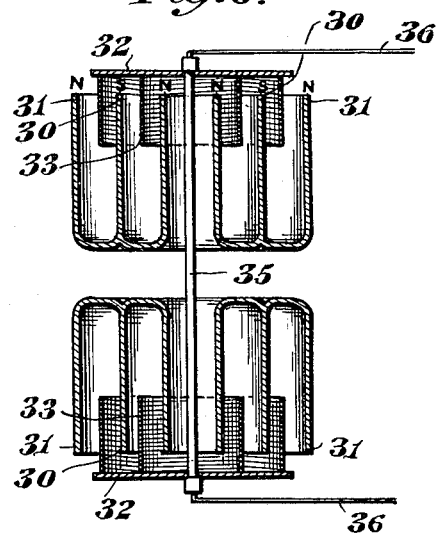
Fig.6.
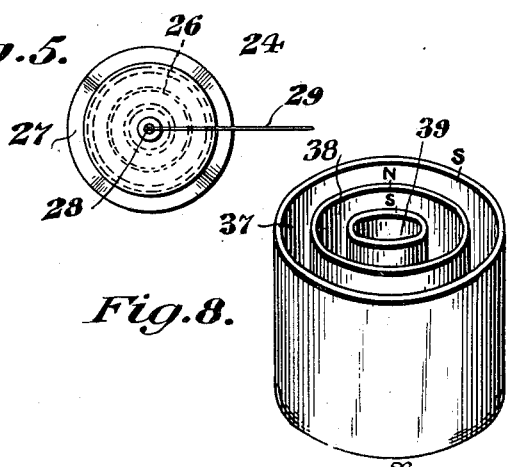
Fig.5.
Fig.8.
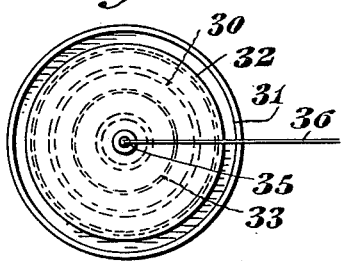
Fig.7.
Inventor
C. A. Heiland,
By
Attorney Jan. 12, 1937.   C. A. HEILAND   2,067,636
VIBRATION DETECTOR
Filed April 24, 1934   2 Sheets-Sheet 2
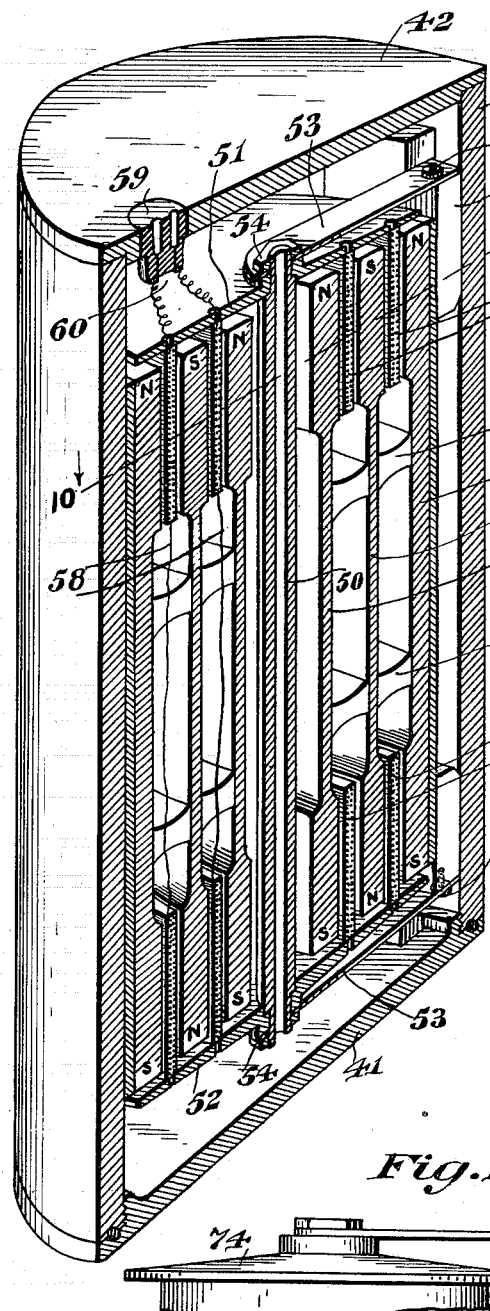
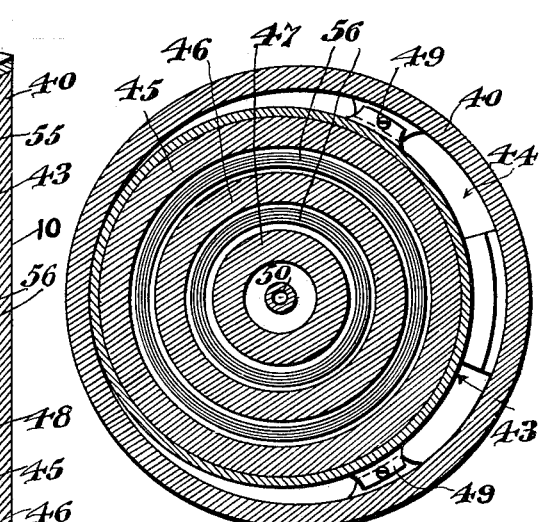
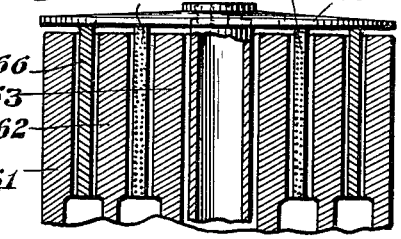
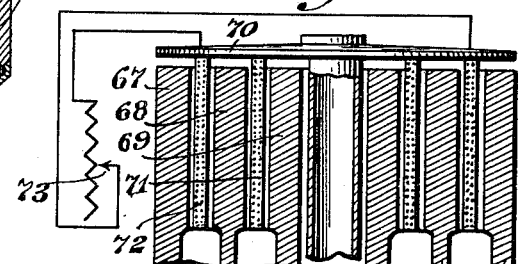
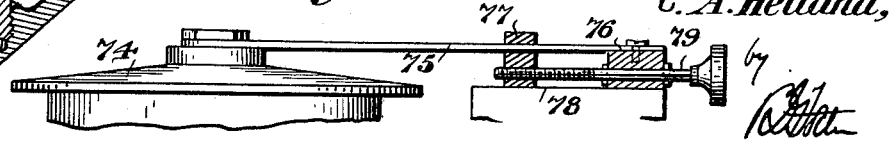
Inventor
C. A. Heiland,
by
Attorney Patented Jan. 12, 1937

2,067,636

UNITED STATES PATENT OFFICE

2,067,636

VIBRATION DETECTOR

Carl A. Heiland, Denver, Colo., assignor to Heiland Research Corporation, Denver, Colo., a corporation of Colorado Application April 24, 1934, Serial No. 722,208

5 Claims. (Cl. 177—352)

The recording and analyzing of mechanical vibrations plays an important part in many industrial fields. The vibration detectors designed for this purpose are either of the mechanical or of the electrical type. In mechanical vibration detectors, vibrographs or seismographs, there is usually provided a mass suspended on a spring or springs which remains virtually stationary with reference to the framework of the instrument, which in turn rests on or is connected in some way to the ground or the vibrating object. The relative displacement of mass and frame is magnified by lever arms and recorded either mechanically by a stylus and smoked paper, or optically by mirror arrangements and moving photographic paper.

The purpose of the electrical vibration detectors, on the other hand, is to convert the mechanical vibration into corresponding electrical impulses which in turn can be recorded by any of the well-known electrical indicating devices, oscillographs, vibration galvanometers and the like. The conversion of the mechanical into electrical impulses may be accomplished in various ways: first, by using electromagnetic coupling; secondly, by capacitive coupling; and third, by pressure coupling. The first type of electrical vibrograph employs, therefore, an inverted dynamic loud-speaker or telephone receiver principle; the second, the condenser microphone idea, and the third, the principle of the carbon microphone, or of the piezo-electric microphone.

The present invention relates to an electromagnetic vibrograph of the type in which a current generating coil vibrates in the magnetic field created by a magnet member.

One of the objects is to provide a structure in which a plurality of magnetic fields are created with a minimum of magnetic material and to employ current generating coils or members cooperating in said fields, and creating a maximum output.

Another and important object is to provide a structure which is extremely compact, and thus is peculiarly adapted for transportation and field use.

Still another object is to provide means whereby the current generating members or coils have a fixed path of movement, and are not open to material lateral play or displacement during their vibratory actions.

Still another object is to provide means for effecting electro-magnetic damping with ease of frequency and damping adjustments.

In the accompanying drawings a preferred embodiment of the invention is disclosed and in connection therewith schematic showings in order to make clear the underlying principles involved.

In said drawings:—

Figure 1 is a view in elevation of a pair of horseshoe magnets creating two magnetic fields side by side.

Figure 2 illustrates how these may be combined to provide a common pole between them, while still maintaining the two magnetic fields.

Figure 3 illustrates how a further development may be made to create four magnetic fields employing three magnet members.

Figure 4 is a view illustrating an embodiment in which two magnet members are made into tubular form with their magnetic fields arranged in tandem relation.

Figure 5 is a top plan view of Figure 4.

Figure 6 is a vertical sectional view showing the development of the same type as that illustrated in Figure 4, to provide a plurality of sets of magnetic fields of tubular form with the sets disposed in tandem relation and the cooperating current generating coils in place.

Figure 7 is a top plan view of the same.

Figure 8 is a perspective view showing how the form illustrated in Figure 3 can be developed into tubular magnets which create sets of magnetic fields, those in each set being side by side and the sets in turn being in tandem relation.

Figure 9 is a perspective vertical sectional view of a structural formation corresponding to the schematic view of Figure 8.

Figure 10 is a horizontal sectional view through the same on the line 10—10 of Figure 9.

Figure 11 illustrates a detail vertical sectional view showing one simple type of means for electrically damping the action.

Figure 12 is a similar view showing another form of electrical damping means.

Figure 13 is a detail sectional view illustrating means for varying the frequency vibration of the current generating means.

In order to explain the invention, attention is first invited to Figure 1, wherein a pair of horseshoe magnets 14 are disclosed, the poles 15 and 16 thereof creating magnetic fields 17 between them. Obviously if one or more coils is placed in these fields 17 and vibrated, current will be generated therein.

If now these magnets are joined together, so that their two corresponding poles are made a common pole, as 18, Figure 2, while their other poles are located on opposite sides thereof, as shown at 19, then it will be clear that two magnetic fields 20 are created, and that the amount of magnetic material is reduced by one-fourth.

Referring now to Figure 3 if three bar magnets are employed as shown at 21 and the central magnet is arranged so that its poles are reversed to the two outer magnets, then it will be obvious that a set of two upper magnetic fields is created, these fields being located side by side, and that another and lower set 23 is also created, the latter fields being located side by side and being arranged in tandem relation to those of the upper set.

Carrying the thought still further, it will be evident that if two tubular horseshoe magnets are provided and are placed in reversed relation, as illustrated in Figure 4 and designated respectively 24 and 25, then there is created between the poles thereof tubular magnetic fields that are disposed in tandem relation. If now current generating coils 26 are placed in these fields and are allowed to have a vibratory action and are electrically connected in series, obviously their output is doubled over what one coil would produce in one magnetic field. In this showing the two coils 26 are mounted on heads 27 connected by a reciprocatory bar 28, the bar being supported by upper and lower spring arms 29 that thus allow the vertical reciprocation of the coils but prevent any lateral swinging or sway. This same combination may be extended as shown in Figures 6 and 7 by carrying forward the arrangement outlined in Figure 2, thus creating two tubular horseshoe magnets with a central common pole 30 and outside poles 31, two sets of the magnets being reversely arranged, as shown, and the heads 32 each supporting two upper and two lower coils 33 in tubular form that operate in the magnetic fields between the respective poles. These heads 32, as in Figure 4, are connected by a central reciprocatory bar 35 supported by spring arms 36.

Now instead of using separate sets of tubular horseshoe magnets as illustrated in Figure 7, the structure outlined in Figure 3 may be created in tubular form, or as shown in Figure 8, in which three cylindrical magnet members 37, 38 and 39 are provided with the central member 38 having its poles reversed with respect to the innermost and outermost magnets. Thus as in Figure 3 there are two upper magnetic fields and two lower magnetic fields secured.

Referring now to Figures 9 and 10 there is disclosed a practical embodiment of the invention involving this specific combination.

An outer tubular casing 40 is provided having a bottom 41 and a top 42. In the same is located an arcuate mounting piece 43 that creates an eccentrically disposed chamber 44. Within said chamber are located three tubular permanent magnets 45, 46 and 47 suitably supported on each other by means of non-magnetic webs 48, the outermost being suitably secured as illustrated at 49 to the mounting piece 43. The central of these cylindrical magnet members has its poles, as indicated, reversed with respect to the innermost and outermost magnets, and they are spaced apart to provide suitable terminal air gaps. Extending vertically through the central magnet 47 is a rod or post 50 whose ends pass through upper and lower heads 51 and 52 and through vibratory spring arms 53. Nuts 54 secure the arms and heads in place. The outer ends of the arms are fastened to the mounting piece 43 as illustrated at 55.

Secured to the head 51 are depending cylindrical current generating coils 56 that operate in the two upper magnetic fields. Supported on the lower head 52 are corresponding coils 57 that operate in the lower magnetic fields. These coils are connected in series as indicated by the wires 58, and a socket member 59 in the casing cap 42 is electrically connected thereto as shown at 60.

It will be obvious that this is not only a peculiarly compact structure which can be taken freely into the field, but that by reason of the relatively great number of magnetic fields and coils employed, a large output of current is secured and that in action, as the coils cut the fields during their vibration caused by the vibration of the object, they can move only in their longitudinal direction and cannot sway back and forth laterally.

Obviously as many fields can thus be created as desired and furthermore the structure lends itself to electrical damping effects and to alterations in the vibratory frequency.

There are a variety of ways in which an assembly of parts, such as shown in Figure 9, may be made.

The pole pieces of either the intermediate tubular magnet 46, or of the other two magnets, may be made in the form of rings which are slipped over the tubular body of the magnet to which they belong. This permits the insertion of the blocks 48 in the spaces between the web portions of the magnets prior to the mounting of such pole pieces. Another method is the making of the tubular magnets, each in two semicircular parts, which when placed together, form the tubular magnet, and in making the blocks 48 in similar form, whereby the blocks 48 may be inserted into the disassembled semi-cylindrical halves of the assembly and then the halves joined together. Still another method is the making of the tubular magnets in the form of tubular sections which when joined together in end-to-end relation, form the complete assembly.

Thus referring to Figure 11, in which the upper portion of the structure similar to that shown in Figure 9 is illustrated, the magnet members are designated respectively 61, 62 and 63, and the upper head 64 is shown as carrying an inner current-creating coil 65 that operates between the innermost magnet member 63 and the central magnet member 62. A damping ring or cylinder 66, carried by the head, operates between the central and outer magnet member. Obviously this arrangement can be altered in various ways.

Adjustable damping may be obtained by such a structure as illustrated in Figure 12, wherein the magnet members 67, 68 and 69 are provided as before with a head 70 above the same. Depending from this head is a current-generating coil 71 that operates in the magnetic field between the central magnet 68 and the innermost magnet 69. Another coil 72 between the outermost magnet member 67 and the central magnet member 68 is employed for adjustable damping purposes, the coil being shorted through an adjustable rheostat 73. Obviously here also either coil may be employed for creating the current and the other for damping.

In Figure 13 there is illustrated a convenient means for varying the vibratory frequency. Here the upper head is designated 74 and is supported by a vibratory spring arm 75 having its outer end fixed as shown at 76. A shoe 77 having a sliding mounting on the arm and slidably supported at 78, can be adjusted by a micrometer or other screw 79 so as to shorten or lengthen the portion of the arm that is thus free to vibrate.

It is to be understood that permanent magnets are preferred in this structure because of their adaptability for field use and their simplicity and compactness.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a vibration detector, the combination with a plurality of completely separate permanent tubular magnets each magnet having a pole at each of its ends and located one within the other and with their poles reversed, thereby providing magnetic fields between said poles, of current generating coils surrounding the ends of the inner magnet and located in the magnetic fields, and vibratory means for supporting the coils to permit their movement longitudinally of the magnets.

2. In a vibration detector, the combination with an assembly comprising a pair of separate tubular permanent magnets each magnet having a pole at each of its ends and located one within the other and with their corresponding poles similarly arranged, of a third tubular permanent magnet located between and separated from the first two and with its poles reversed to those of the pair, said magnets creating a plurality of magnetic fields between their respective poles at both ends of the assembly, a plurality of sets of coils located in the respective magnetic fields, and a vibratory support for said coils comprising a flat spring at each end of the assembly, each spring having a free end, between which ends the coils are supported.

3. In a vibration detector, the combination with a plurality of magnet members in tubular form located one within the other, spaced apart, and creating separate magnetic fields between them, of a generating coil movably positioned in one of said fields, a damping member movably positioned in another of said fields, and vibratory supporting means for said coil and damping member.

4. In a vibration detector, the combination with a plurality of magnet members in tubular form, located one within the other, spaced apart, and creating a magnetic field between them, of a generating coil located in said field, a spring arm having a fixed mounting and constituting a vibratory support for the coil, and means adjustable to different positions along the arm for holding variable portions of the same against vibration and thereby varying the vibratory frequency of the support.

5. In a vibration detector, the combination with a plurality of completely separated longitudinal permanent magnets, each having poles at each of its ends, the said magnets being located side by side in spaced relation and with their adjacent poles reversed and creating magnetic fields that extend into the spaces between the ends of the magnets at each end, of a plurality of generator members positioned in the magnetic fields between the ends of the magnets, rigid means connecting the generator members, and spaced vibratory supports by which the generator members are supported to move in a direction substantially parallel to the longitudinal axes of the magnets.

CARL A. HEILAND.